Oct. 21, 1958  W. H. EVANS  2,856,800
ADJUSTING AND SETTING MECHANISM FOR EXPANSION REAMER
Filed Dec. 12, 1957  2 Sheets-Sheet 1
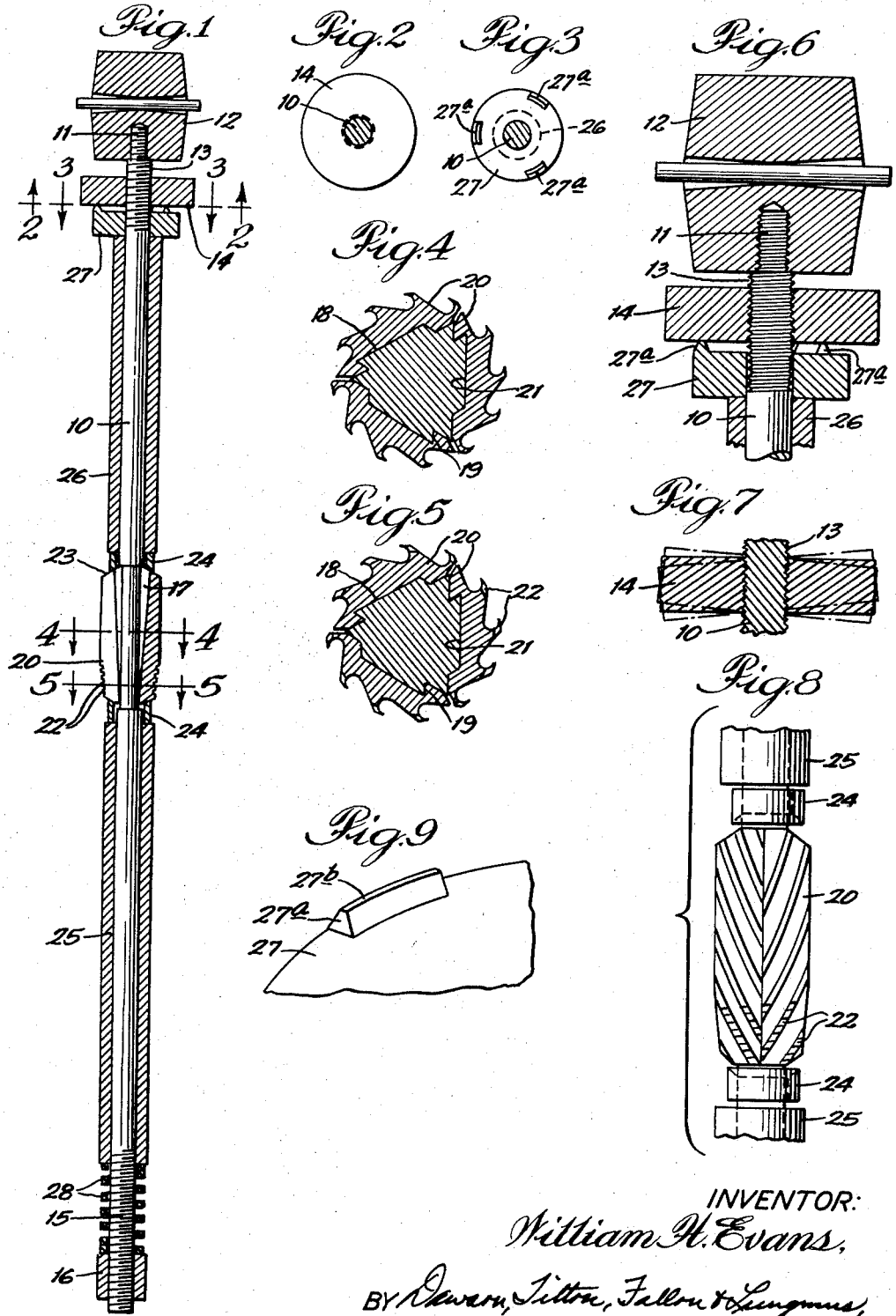
INVENTOR:
William H. Evans,
BY Dawson, Tilton, Fallon & Lungmus,
ATTORNEYS.

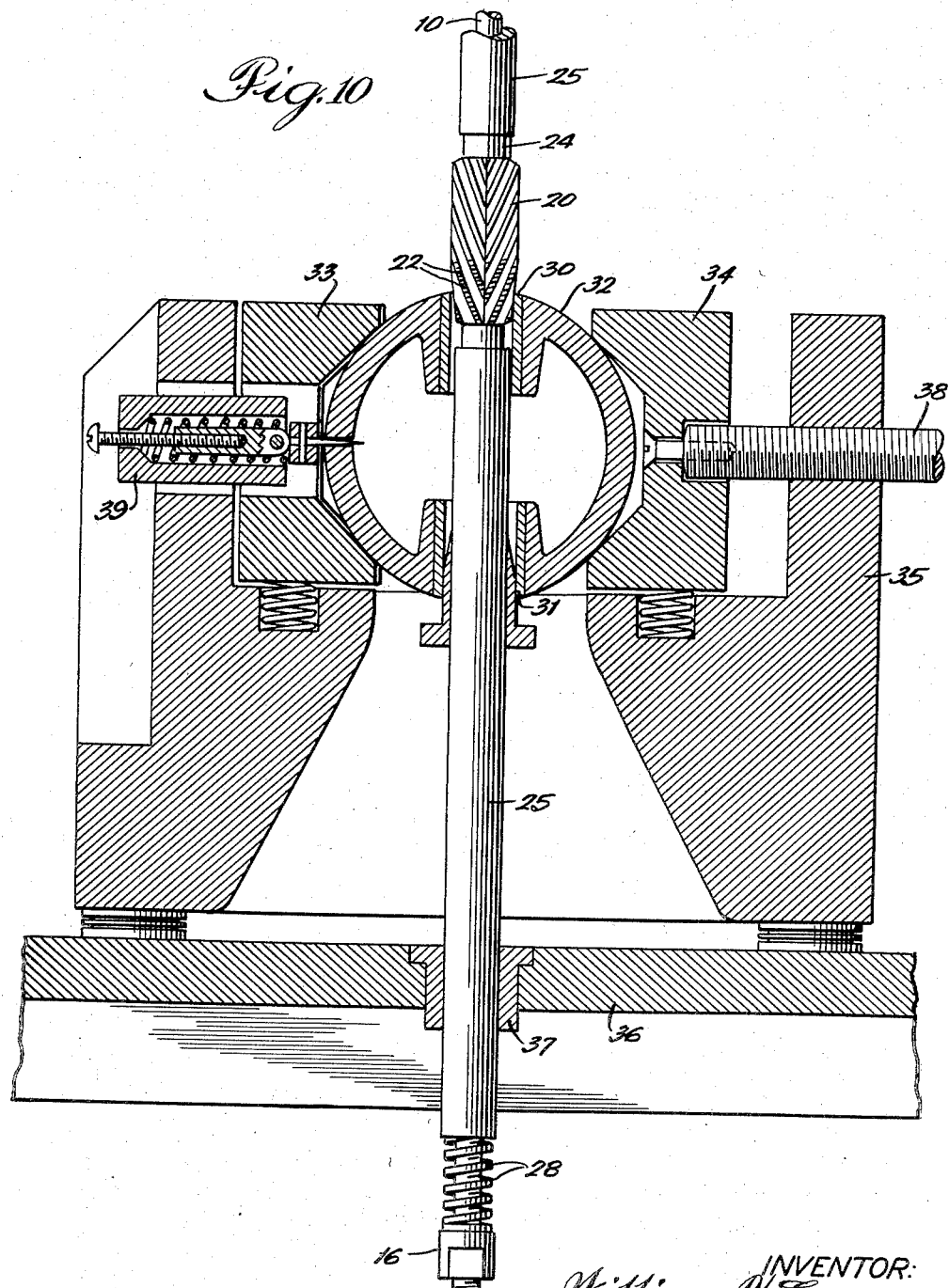

United States Patent Office

2,856,800
Patented Oct. 21, 1958

2,856,800

ADJUSTING AND SETTING MECHANISM FOR EXPANSION REAMER

William H. Evans, Miami Beach, Fla.

Application December 12, 1957, Serial No. 702,341

6 Claims. (Cl. 77—75.5)

This invention relates to an adjusting and setting mechanism for an expansion reamer, and more particularly for an expansion-type reamer adapted for use on a line-reaming and boring machine.

The present application is a continuation-in-part of my copending application, Serial No. 456,494, filed September 16, 1954, now abandoned.

A general object of the present invention is to provide an expansion reamer structure which permits the reaming of a hole through the piston pin bearing or connecting rod bearing in a single operation, in contrast with prior practice where six or seven cut have been required. A more specific object of this invention is to provide a novel adjusting and setting mechanism for an expansion reamer so that the multiple blade assembly is self-centering for the purpose of accurately reaming a hole of a given size but in which the diameter of that assembly will not vary during the course of a reaming operation. A still more specific object is to provide an adjusting and setting mechanism of the character described wherein the reamer blades are held in place under spring tension, the tension being adjustable according to the particular size or radius of the cutter blades.

Another object is to provide in connection with the adjusting and setting mechanism of a reaming device, self-locking means whereby the cutting radius is maintained during a reaming operation and is not subject to variation due to pressure from the workpiece being reamed, or due to bumping of the reamer by the operator, etc. Another object is to provide a reamer having a reamer blade assembly provided with a tapered leading end portion, the tapered portions of the blades having a thread cut in the lands thereof to reduce cutting resistance and maintain proper alignment of the reamer at the commencement of a reaming operation.

In the disclosed embodiment of my invention, I have found that the above objects can be achieved by providing a three point contact between the feed nut and the loosely-fitting operating nut which controls the spring tension directed against the cutting blades. The uniform distribution of force at the three spaced contact points prevents displacement or rotation of the operating nut during a cutting operation, while at the same time, the spring-secured reamer blades may settle tightly against the seat provided by the mandrel without resistance from the universal bushings or retainer rings at opposite ends of those blades. In this connection, I have found that an important feature in obtaining these results lies in the universal or self-centering character of the retainer rings and the coaction of those rings with the tension adjusting mechanism of the reamer structure.

The invention is shown in an illustrative embodiment, by the accompanying drawing, in which—

Figure 1 is a vertical sectional view of an expansion reamer structure embodying my invention; Figure 2, a transverse sectional view taken along line 2—2 of Figure 1; Figure 3, a transverse sectional view taken along line 3—3 of Figure 1; Figure 4, an enlarged transverse sectional view taken along line 4—4 of Figure 1; Figure 5, an enlarged transverse sectional view taken along line 5—5 of Figure 1; Figure 6, an enlarged broken vertical section of the reamer showing structural features of the tension adjusting mechanism; Figure 7, an enlarged and somewhat diagrammatic sectional view of the operating nut and its mounting upon the reamer mandrel; Figure 8, an enlarged broken longitudinal view of the reamer blades and the self-centering retainer rings therefor; Figure 9, an enlarged fragmentary perspective view of the top of the feed head showing one of the projections thereon, and Figure 10, a side elevation taken partly in section illustrating the reamer of the present invention in a piston reaming operation.

In the illustration given, 10 designates a mandrel having an upper reduced end portion 11 threadedly engaging a hardened bushing 12 adapted to be connected to a rotary driveshaft in a line reaming machine, as illustrated generally in my Patent No. 2,584,005.

The mandrel 10 is provided at its inner end adjacent the bushing 12 with a threaded portion 13 on which is threadedly mounted an adjusting nut 14. The mandrel at its outer or free end is also provided with a threaded portion 15 on which is mounted a nut 16.

At an intermediate portion, the mandrel 10 is provided with integral tapered segment-bearing surfaces 17. As shown more clearly in Figure 4, each of the segment-bearing surfaces 17 has a raised portion 18 undercut at one side to provide a hook-like connection 19.

About the tapered segment-bearing or segment-seating surfaces 17 is mounted a reamer blade assembly comprising three cutting segments 20, each of which has on its inner side a supporting surface 21 shaped generally to correspond with seat 17 and having a recess for receiving the hook-like connection or support 19. The cutting segment and tapered supporting surface are described more fully in my Patent No. 2,421,490.

In Figures 1 and 8 it will be seen that the entire reamer blade assembly is tapered at its lower or leading end portion so that a hole will not be reamed to its fullest dimensions until this lower portion has completely passed into and through a work piece. It will also be noted that the lands at the lower portion of the reamer are provided with spiral grooves or threads 22, thereby reducing the cutting area of the leading portion. By this construction, proper orientation of the device is insured at the commencement of a reaming operation despite initial forces which might otherwise tend to axially displace the reamer, as will be described more fully as the specification proceeds.

The cutting segments are provided at each end with beveled surfaces 23, and such surfaces are engaged by universal retainer rings 24. As illustrated most clearly in Figures 1 and 8, the retainer rings 24 have a substantially greater inner diameter than the outer diameter of the mandrel 10 and, like the cutting segments, are provided with beveled surfaces engaging the inclined or beveled surfaces of the segments. Consequently, the rings are capable of lateral displacement in the absence of longitudinal forces which urge the opposing beveled surfaces of the rings and segments together and which thereby drive the rings into coaxial alignment with the mandrel. Below the lowermost retainer ring 24 is a tubular retainer member 25 and above the upper retainer ring 24 is a tubular retainer member 26. Above the upper tubular member 26 is an enlarged feed head 27 by means of which a controlled downward pressure can be applied to the member 26 in tight frictional contact therewith.

In the illustration given, the tension adjusting nut 14 is provided on its underside with a continuous flat bearing surface (Figure 2), while the feed head 27 is provided with three uniformly and circumferentially spaced projections 27a having narrow bearing surfaces at the tops thereof for limited frictional engagement with the adjusting nut's continuous bearing surface. As clearly shown in Figure 3, the three projections 27a are substantially uniformly spaced from the longitudinal axis of mandrel 10. The tops of the projections, as well as the continuous bearing surface on the bottom of the adjusting nut, are case hardened to reduce wear and facilitate relative movement between the parts. The specific construction of projections 27a is shown more clearly in Figure 5 where it can be seen that the top of the projections consist of flat bearing surfaces 27b.

Extending between the lower tubular retainer 25 and the lower tension adjusting nut 16 is a compression spring 28. This helical compression spring acts through retainer 25 upon lower ring 24 and cutting segments 20. The longitudinal force of the spring is transmitted through the cutting segments to the upper retaining ring and retainer 26, and is opposed by the upper adjusting nut 14. Thus, the cutting segments 20 are clamped between rings 24 and retainers 25, 26, the clamping force being delivered by compression spring 28 and being opposed by adjusting nut 14 bearing against the feed head. The optimum tension for cutting segments of any given size is thereby obtained by rotation of adjustment nuts 14 and 16.

As shown in Figures 6 and 7 in somewhat exaggerated form for purposes of illustration, the upper adjusting nut 14 is loosely threaded upon portion 13 of the mandrel 10. As a result, nut 14 may be easily rotated when adjustment is required. However, an even more important aspect of this connection lies in the fact that the nut is capable of tipping slightly (Figure 7) so that pressure exerted by spring 28 and transmitted by projections 27a will be applied equally by those three projections against the smooth undersurface of the nut. The nut is therefore self-aligning to present a flat bearing undersurface identical with the transverse plane defined by surfaces 27b of the three projections. The slight tipping capacity of the adjusting nut 14, in combination with the three uniformly spaced projections 27a, assures an equalized or centralized pressure between the bearing surfaces of the respective members which prevents relative movement of the adjusting nut during a reaming operation despite vibration or other factors which might otherwise tend to vary the setting.

As indicated above, adjustment nut 16 is rotated to increase or decrease spring tension according to the size of the reamer blades. At the same time, minor variations in the cutting radius are accomplished by simply rotating adjusting nut 14 to control the distance which the blades are moved along the inclined cam surfaces under the force of the compression spring. The increase or decrease in diameter of the cutting elements is thus regulated precisely to a thousandth of an inch, and the adjustment can be easily made without undue friction. Since the bearing surfaces provided on the tops of projections 27a are urged into a limited frictional engagement with the continuous bearing surface on the bottom of self-aligning adjusting nut 14 by the pressure exerted by spring 28, the result is a substantial self-locking of the reamer at a selected cutting radius. The limited stationary friction between the opposing bearing surfaces can be controlled so that there is substantially no tendency for the cutting radius to vary as the reaming operation is being carried out, and also to provide a substantial protection against an inadvertent change in cutting radius by the operator striking or bumping the reamer.

An important aspect of the present invention lies in the enlarged loose fitting retaining rings 24 with their opposing beveled surfaces since these rings, in cooperation with sleeves 25, 26, tension spring 28 and adjusting nuts 14, 16, hold the reamer blades in seated condition upon mandrel 10. The rings 24 are capable of lateral displacement and therefore, in response to longitudinal forces, are self-seating against the inclined or beveled ends of the blades. The result is that the tension of spring 28 transmitted by the retaining rings operates to tightly seat each of the blades upon its supporting surface 21 with the hook-like connection 19 snugly disposed within the blade recess.

In Figure 10 I show the reamer in position for reaming the upper and lower wrist pin bearings 30, 31 of a piston 32 held between opposing clamping blocks 33, 34 which in turn are supported by a work holder 35. The work holder is mounted upon a bed 36 which is equipped with a bearing 37 slidably receiving the lower sleeve 25 of the reamer. Adjustment of clamping block 34 is obtained by rotation of threaded shaft 38, and plunger assembly 39 assists in anchoring the piston in place. Reference may be had to my Patent 2,670,635, issued March 2, 1954, for details of the structure and operation of the clamping and supporting apparatus. Since this apparatus does not constitute a part of the present invention, the above description is believed sufficient for present purposes.

When a piston is to be reamed, it is mounted as shown with the lower bearing 31 aligned with the axis of the reamer and with the axis of the piston normal to the reamer's axis. Often, when this has been done, the upper bearing 30 is slightly out of line with the reamer so that, as shown in Figure 10, one side of the bearing is closer to the reamer axis than the opposite side. Also, the bearing opening may be oval or egg-shaped in cross-section because of imperfect mounting and unequal wear during use. Thus, as the reaming operation is commenced, a side strain of considerable magnitude is imposed upon the reamer blade assembly which tends to displace or bend the reamer laterally and center it within the upper bearing. However, by tapering the lower portion of this reamer blade assembly, and by reducing the cutting surface of the lower portion by thread groove 22, the blades are able to resist this lateral force and ream the upper bearing into perfect vertical alignment with the lower bearing 31. Furthermore, such reaming may be accomplished in a single stroke, in contrast to the ordinary practice where successive strokes are required.

Despite lateral or side forces applied to the reamer blades during a reaming operation, the stabilizing three point contact between the feed head and adjustment nut maintain a uniform cutting radius and the universal retainer rings 24 hold the blades in tightly seated condition upon the cam surfaces 18. Thus, the cooperative effect of the universal bushings, the three point contact, the tension spring, the tipable adjustment nut and the tapered threaded reamer blade assembly produce a reamer structure capable of reaming in a single operation that which previously has required successive reaming strokes.

The principal features of the present invention may be summarized as follows:

(1) The looseness of the thread and the three point pressure on the adjusting nut absorbs any out-of-line machine work made on the thread, giving straight line pressure in adjusting size of the reamer blades.

(2) The amount of contact surface on the three points is adjusted to suit the different size reamers.

The size of the surface on the three point contacts and the adjusted spring pressure on the blades will give the exact friction necessary to keep the reamer size from changing while moving from one operation to another, through bumping, etc. An operator can set the proper friction as he pleases on all sizes of reamers merely by adjusting the pressure spring nut.

(3) When a solid or non-universal bushing with a bevel that fits the bevel on the reamer blade is used, it holds the reamer blades rigid and will not allow the blades to enter the dovetail under pressure of cutting, as the reamer shank is not in line with the dovetail. This disalignment is caused by the fact that the three dovetails and the surfaces supporting the three blade segments are separately milled in the mandrel so that the thickness and stiffness of the mandrel is different in each of the successive milling operations. As a result of this variation, the respective blade-supporting surfaces and the dovetails provided thereby do not have precisely the same relation with respect to the axis of the mandrel. Therefore, in an ordinary reamer, the retainer ring carried by the mandrel actually prevents one or more of the blades from seating tightly within its dovetail in response to the side forces arising during a cutting operation.

In my reamer combination, the two universal bushings allow the reamer blades to seat firmly within the dovetails under pressure of cutting. Therefore, the blades are solidly held in place and there is no change in diameter in response to cutting forces. When the reamer blades are wedged in the dovetail, these two universal bushings will show off-center with the shank of the reamer.

(4) To get a perfect alignment in reaming two holes, as on a piston, the leading part of the reamer that enters the hole first, must have the least resisting cutting edge so it will cut off the high points of an egg-shaped hole without favoring one side or the other, even if one side of the hole is heavier than the other.

To insure perfect alignment in the operation of the present reamer, I have cut down the width of cutting edge on the lead end of the three reamer blades by providing a tapered thread, leaving about 1/16 wide cutting face on each tooth. Thus, the provision of three cutting blades each having a tapered and threaded end reduces the cutting surface and insures proper alignment of the reamed holes by eliminating lateral displacement of the reamer at the commencement of a cutting operation.

(5) The reason a pressure spring is put on the front or lower end of the reamer is that this arrangement produces a solid reamer, with no give, capable of finishing a hole in one cutting stroke. In conventional reamers where the spring is disposed above or in back of the reamer blades, it takes five or six cuts to finish a hole.

Only three points will balance perfectly on an uneven surface.

The cooperative effect of all five of the above features combined in a single reamer structure produces a superior reamer capable of accurately reaming the holes through wrist pin bearings or connecting rod bearings in a single reaming operation or stroke, in contrast with the usual practice where a number of strokes are necessary in order to achieve the desired result.

While in the foregoing I have set forth a specific structure in considerable detail for the purpose of illustrating an embodiment of my invention, it will be understood that such details of structure may be varied widely by those skilled in the art without departing from the spirit of my invention.

I claim:

1. In an adjustable reamer, a mandrel having a threaded portion at each end thereof and being equipped intermediately with a plurality of circumferentially spaced cam surfaces, cutting segments disposed upon said cam surfaces for axial movement thereon, an adjusting nut loosely threaded on the upper end portion of said mandrel for limited tipping movement thereon, a feed head being disposed beneath said adjusting nut and being axially movable along said mandrel, one of the adjacent ends of said feed head and said adjusting nut providing a smooth flat bearing surface and the other end providing three circumferentially and uniformly spaced projections having narrow bearing surfaces, a compression spring disposed about said mandrel beneath said cutting segments, means disposed about said mandrel between said segments and both said compression spring and said feed head for retaining said segments on said surfaces while being shiftable axially, and a tension adjustment nut threadedly mounted upon the lower end portion of said mandrel and arranged to urge said compression spring upwardly and thereby to exert an upward pressure on said cutting segments.

2. The structure of claim 1 in which said means disposed about said mandrel for retaining said segments on said cam surfaces comprises a pair of retainer rings loosely mounted upon said mandrel and engaging opposite ends of said cutting segments, said rings and segments having opposing beveled surfaces for urging said segments against said cam surfaces in response to opposing longitudinal forces directed against said rings.

3. The structure of claim 1 in which said cutting segments are each provided with tapered leading end portions of diminishing cutting radius, said tapered end portions having the cutting edges thereof circumferentially threaded.

4. An adjustable reamer comprising a vertical mandrel having threaded upper and lower ends and being intermediately provided with a plurality of circumferentially-spaced cam surfaces for receiving a reamer blade assembly, a reamer blade assembly comprising a plurality of vertically elongated cutter blades each having beveled ends and being longitudinally slidable along said cam surfaces, said cutter blades having lower tapered end portions providing a reamer blade assembly of downwardly diminishing cutting radius, said end portions also being circumferentially threaded, a pair of annular retainer members extending loosely about said mandrel at opposite ends of said reamer blade assembly and having beveled surfaces in contact with the beveled ends of said blades, spring means disposed along the lower portion of said mandrel for urging said members and blades upwardly, an axially movable sleeve extending upwardly from the retaining member above the reamer blade assembly, an axially slidable feed nut extending about said mandrel and bearing against the upper end of said sleeve, an adjusting nut threadedly received upon the upper end of said mandrel and being mounted thereon for limited tipping movement, one of the adjacent ends of said feed head and said adjusting nut providing a continuous flat bearing surface and the other adjacent end providing three uniformly and circumferentially spaced projections having narrow bearing surfaces at the ends thereof for limited frictional engagement with said continuous bearing surface, and adjusting means for selectively varying the tension of said spring means.

5. In an adjustable reamer, a mandrel being provided intermediate the ends thereof with surfaces for receiving three circumferentially-spaced cutter blades, three elongated cutter blades each having tapered ends and being longitudinally slidable along said mandrel surfaces, a pair of annular retainer members extending loosely about said mandrel and having beveled surfaces in contact with the tapered ends of said blades, spring means disposed along said mandrel between one of the ends thereof and one of said retainer members for urging said members and blades in one longitudinal direction along the mandrel, restraining means adjacent the opposite end of the mandrel for opposing longitudinal force of said spring and for restraining longitudinal movement of said cutter blade and the retainer members, and adjusting means for varying the tension of said spring, whereby, the opposing longitudinal forces applied against the loosely-fitting retainer members and the cutter blades center the retainer members engaging the tapered ends of the blades and urge the blades tightly against the mandrel surfaces, said restraining means being adjustable and comprising an axially-movable sleeve extending between said opposite end of said mandrel and one of said retaining members, said opposite end of said mandrel threadedly receiving an adjusting nut, a feed head disposed between an end of said sleeve and said adjustment nut, one of the adjacent ends of said feed head and said adjusting nut providing a continuous flat bearing surface and the other adjacent end providing three circumferentially and uniformly spaced projections having narrow bearing surfaces at the ends thereof for limited frictional engagement with said continuous bearing surface, said intermediate surfaces of said mandrel being axially inclined for varying the cutting radius of said reamer when said cutter blades are moved longitudinally therealong, whereby, upon rotation of said adjustment nut said blades are shifted axially to vary the cutting radius thereof.

6. The structure of claim 5 in which said adjustment nut is loosely threaded upon said mandrel and is capable of tipping movement thereon, whereby, the frictional force between said nut and said feed head is uniformly distributed between said circumferentially and uniformly spaced projections.

References Cited in the file of this patent

UNITED STATES PATENTS

| | | |
|---|---|---|
| 1,509,443 | Peterson | Sept. 23, 1924 |
| 1,730,231 | Nestor | Oct. 1, 1929 |
| 2,582,524 | Blazek | Jan. 15, 1952 |